April 24, 1951 L. E. SHAW 2,550,431
VARIABLE-SPEED TRANSMISSION CHAIN
Filed Sept. 10, 1948 2 Sheets—Sheet 1
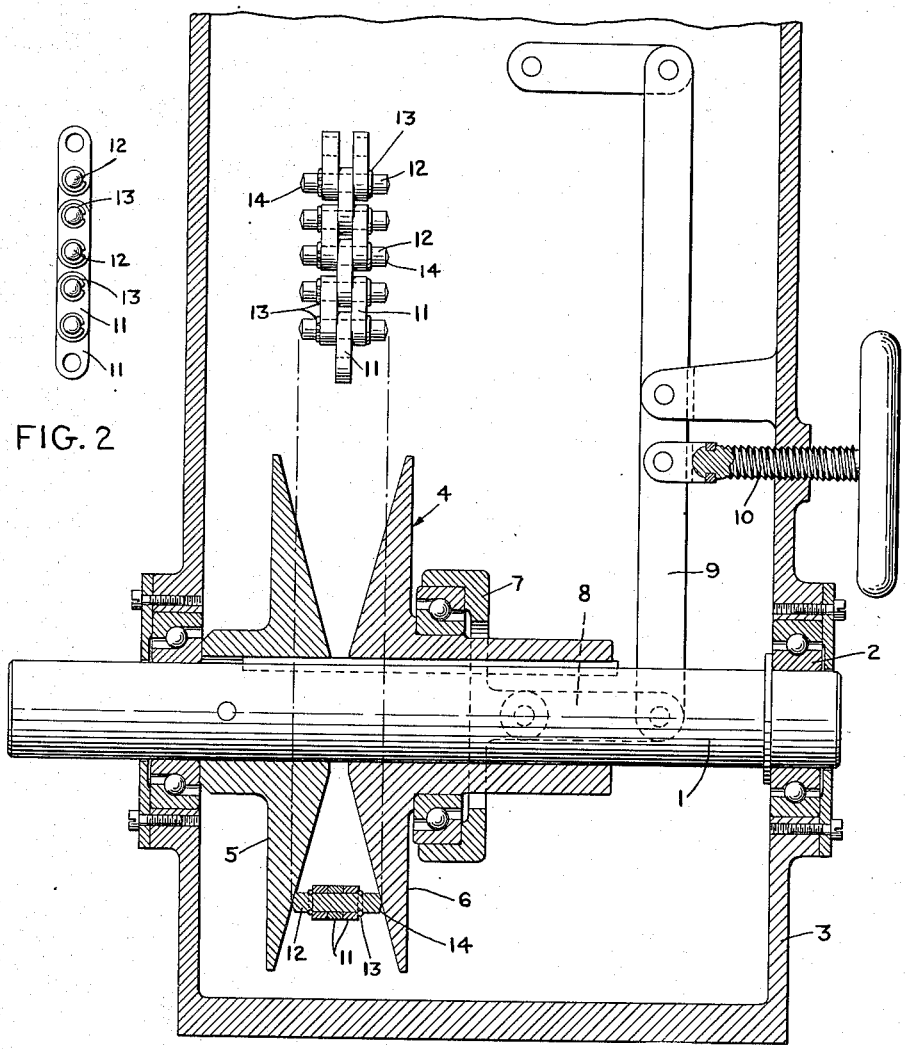
FIG. 2
FIG. 1
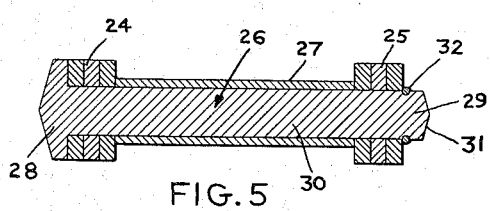
FIG. 5
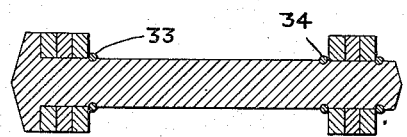
FIG. 6
LOUIS EATON SHAW
*INVENTOR.*
BY *Robt Meyer*
*attorney*

April 24, 1951 — L. E. SHAW — 2,550,431
VARIABLE-SPEED TRANSMISSION CHAIN
Filed Sept. 10, 1948 — 2 Sheets-Sheet 2
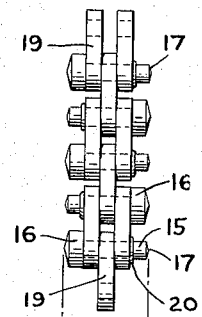
FIG. 4
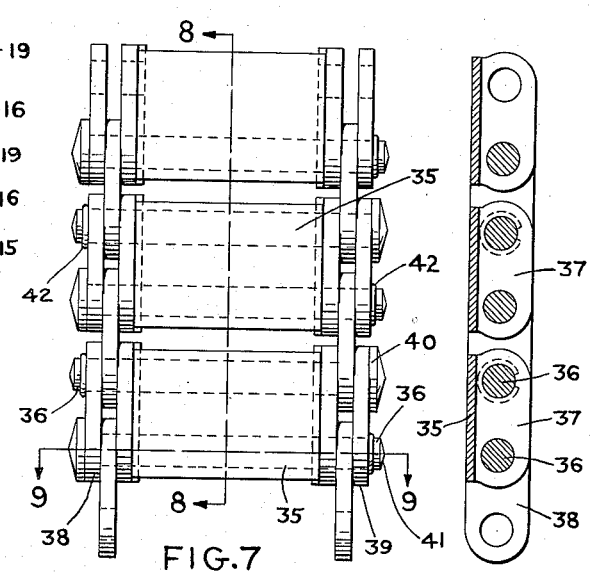
FIG. 7
FIG. 8
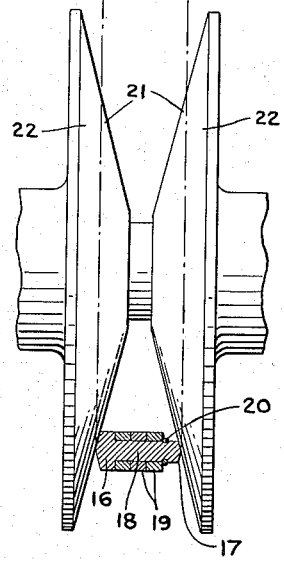
FIG. 3
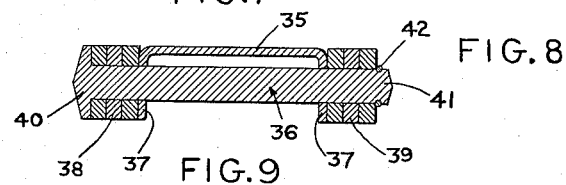
FIG. 9
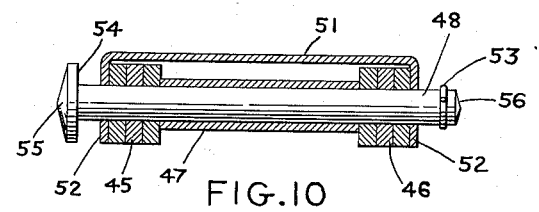
FIG. 10
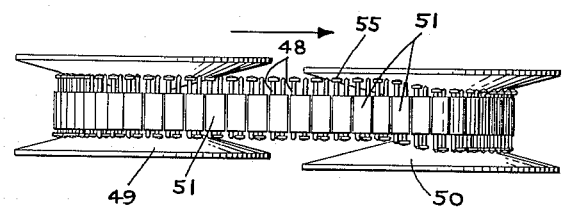
FIG. 11
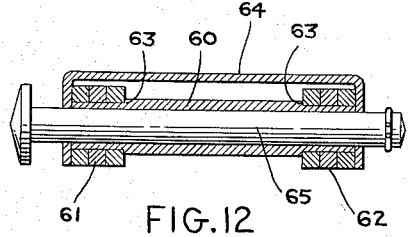
FIG. 12
LOUIS EATON SHAW
INVENTOR.
BY [signature] attorney Patented Apr. 24, 1951

2,550,431

UNITED STATES PATENT OFFICE 2,550,431

VARIABLE-SPEED TRANSMISSION CHAIN

Louis Eaton Shaw, Newark, N. J.

Application September 10, 1948, Serial No. 48,629

21 Claims. (Cl. 74—230.17)

This invention relates to variable speed power transmissions and more particularly to a power transmission chain for use in such transmissions.

In variable speed transmissions of the type using V-belts running over a pair of sheaves, each formed by a pair of frustro-conical flanges, the presence of oil on the flange faces causes the belts to slip and quickly burn out even though they are made of oil resistant materials. Transmissions of this type are usually enclosed in a metal housing provided with openings for the circulation of air and the dissipation of the heat generated by the friction of the belts entering and leaving the flanges, and by internal heat caused by flexing and distortion.

Since at least one flange of each pair of sheaves is shiftable and thus requires lubrication on its sliding surfaces, the problem of lubricating such surfaces without having the lubricant spread over the flange faces is difficult.

Another trouble frequently experienced results from operating the power transmission mechanism for extended periods of time at one speed setting. If lubricant is not properly distributed over the sliding surfaces by shifting the transmission throughout its speed range at least once a day it is gradually thrown out by centrifugal force, leaving the surfaces dry whereupon "fretting" occurs and they quickly "seize."

With transmissions of this type it is highly desirable that the speeds of the input and output shafts be kept as high as possible in order to achieve the required belt velocity without having to resort to large sheave diameters, thus saving both cost and space. When lower output speeds are desired it is common practice to place a gear reducer between the output shaft of the transmission and the driving shaft of the machine to be driven.

An object of the present invention is to provide a metal power transmitting chain which, when employed in variable speed transmissions, will provide a variable speed transmission that may be run in a totally closed housing making it explosion proof, with all the parts flooded with oil to insure thorough lubrication at all times and under all conditions of service, will permit the location of any required reducing gears within the housing and thus save the cost and space requirements of an extra housing and still insure their being properly lubricated; will reduce slippage between the sheaves and their connecting member without resorting to destructively high pressures at the points of contact therebetween; will keep the temperature within the housing within reasonable limits without bringing air in from the outside of the housing, will raise the efficiency of a variable speed power transmission above that which can be obtained with V-belts of the usual type and will accomplish other results of a beneficial nature.

The improved chain of the present invention is made up of links and pins in a manner similar to conventional power transmitting chains but the pins extend well beyond the sides of the links and the ends of the pins are conical, providing a line contact bearing against the flange faces of the sheaves driving or being driven as the result of the friction at these points. Since several pins will always be in contact with the flanges, even when the latter are separated to their greatest degree of adjustment, the unit pressure necessary to give the required traction (as determined by the sheave angle and the chain tension) is greatly reduced from that necessary with but one, or two, or three points of contact such as are found in the "friction type" transmissions now on the market. The danger of "spalling" is therefore greatly reduced or entirely eliminated.

As has been above set out, heating in conventional V-belts is due to friction against the flange faces and to internal friction due to flexing and distortion. With a chain of the type of the present invention there is no distortion in the accepted sense, and friction is almost wholly absent. Therefore, the amount of heat to be dissipated from the transmission housing will be slight and the efficiency of the transmission will be high.

Since there is a little relative angular motion between the pins and links on entering and leaving the sheaves, the pins are given a constant creeping action by which wear on their conical ends as well as on their shanks is evenly distributed.

Wear on the flange faces is also evenly distributed by virtue of the fact that at only certain specific points of adjustment (where the pitch circumference of the sheave is exactly divisible by the spacing of the pins) could the pins successively strike at the same point on the flange and it would be impossible to preserve such a condition for more than a few moments at a time because of minute variations in the pitch, and the length of the pins and the slight creepage between the pins and the flange faces that could never be entirely eliminated. Moreover, the relatively light pressures between the pins and the flanges and the presence of oil between them also acts to reduce wear to a minimum.

It is evident that it is desirable to make the distance between adjacent pins as small as is practically possible since this gives more pins in contact with the sheave flanges at one time and also insures smoother operation of the chain; therefore, another object of the present invention is to make the pins with heads of larger diameter than the shanks and insert them alternately from the two sides of the chain whereby there is a less tendency of the chain to tilt in the sheave.

With these and other objects in view, as may appear from the accompanying specification, the invention consists of various features of construction and combination of parts, which will be first described in connection with the accompanying drawings, showing a variable speed transmission chain of a preferred form embodying the invention, and the features forming the invention will be specifically pointed out in the claims.

In the drawings

Figure 1 is a fragmentary section through a variable speed power transmission showing a part of the improved transmission chain in top elevation and one part in section.

Figure 2 is an edge elevation of the improved power transmitting chain.

Figure 3 is a fragmentary view of a variable speed power transmitting V-groove showing in plan and in section a modified form of the improved power transmitting chain.

Figure 4 is an edge elevation of the modified form of the power transmitting chain.

Figure 5 is a cross section of a further modified form of the chain showing one manner of spacing the links of the chain and holding them against relative lateral movement.

Figure 6 is a cross section through another modified form of the chain showing a modified construction for holding the links of the chain in proper spaced position relative to the pins.

Figure 7 is a top plan of a wide spaced link form of the chain showing spacers designed to prevent one side of the chain from running ahead of the other.

Figure 8 is a longitudinal section taken on the line 8—8 of Figure 7.

Figure 9 is a cross section taken on the line 9—9 of Figure 7.

Figure 10 shows a cross section through a further modification of the power transmitting chain constructed to meet conditions contingent with slight axial misalignment of the sheaves with which the chain is employed.

Figure 11 is a plan view illustrating the manner of operation of the modified form of the chain shown in Figure 10.

Figure 12 is a cross section through a slightly modified form of the chain shown in cross section in Figure 10.

Referring more particularly to the drawings, Figure 1 shows a power transmitting shaft 1 carried by suitable bearings 2 supported by the housing 3. The V-grooved sheave structure 4 is composed of frustro-conical flanges 5 and 6, both of which are keyed on the shaft 1 for rotation therewith. As is usual in variable speed transmissions, the flange 5 is locked against longitudinal or axial movement relative to the shaft 1, while the flange 6 is free to move axially of the shaft. In the structure shown in Figure 1 of the drawings, the shiftable flange 6 is connected by suitable collar 7 and link 8 to a pivoted lever 9 which is adjusted by means of a hand-operated screw 10 to move the flange 6 axially of the shaft 1 and vary the operative pitch diameter of the sheave 4.

The chain structure of the present invention which is employed in connection with the variable pitch sheave in lieu of V-belts comprises the plurality of links 11 which are similar in construction to links of the conventional power transmitting chain structure. The links 11 are arranged in stagged rows, as clearly shown in Figure 1 of the drawings, and are connected by pins 12. The pins 12, however, unlike the pins in conventional type of power transmitting chains which operate over cogs or sprockets, project appreciable distances beyond the outer sides of the outside rows of links 11 and the pins are held against longitudinal or axial movement relative to the links 11 by ordinary snap rings 13. The outer ends of the pins 12 are conical in shape, as shown at 14, so as to provide line contact with the faces of the frustro-conical flanges 5 and 6 of the sheave 4, as is clearly shown by the sectional part of the chain shown at the lower part of Figure 1 of the drawings. While the type of chain shown in Figures 1 and 2 of the drawings shows three rows of links 11, it is to be understood that any number of links may be employed without departing from the spirit of the present invention.

The improved chain, as shown, will permit the variable speed transmission to be run in a totally enclosed housing, making it explosion proof and permitting thorough lubrication in that the interior of the housing may be flooded with oil at all times and under all conditions of service. It will reduce slippage between the sheaves and their connecting member without resorting to destructively high pressures at the point of contact between the chain and the sheaves. The conical ends 14 of the pins provide a line contact bearing against the flange faces of the sheave 4, driving or being driven as a result of the friction at the line contact points. Several of the pins will always be in contact with the flanges even when the flanges are separated to their greatest degree of adjustment and the unit pressure necessary to give the required traction is greatly reduced from that necessary in the friction type transmissions now on the market.

It is desirable in power transmission chains of this type to make the distance between the adjacent pins as small as is practically possible since this gives more pins in contact with the sheave flanges at one time and also insures smoother operation of the chain. However, a certain degree of distance between the pins is necessary in the construction of the chains and for the purpose of providing as great a surface contact between the pins and the sheave flanges as is possible. A modified construction of the chain is shown in Figures 3 and 4 of the drawings. In this modification of the chain construction the pins 15, instead of being symmetrical, are formed with an enlarged conical head 16 on one end. The ends of the pins opposite to the enlarged conical heads 16 are also conical in shape as shown at 17. They are however, of the same diameter of the pin body or shank 18 which extends through the links 19. A snap ring 20 is used on each pin 15 about its end which is the same diameter as the shank 18 for holding the pins against axial movement relative to the links 19. As is clearly shown in Figure 3, the pins 15 are inserted alternately from one side or the other of the chain thus providing longer bearing surfaces against the faces 21 of the flanges 22 of the sheaves. This longer bearing surface tends to prevent the chain from twisting in the space between the flange faces.

With the chain running between the conical faces of a variable pitch sheave, the amount of speed variation that can be obtained depends upon the angle between the flange faces and the width of the chain, since these two factors govern the maximum and minimum pitch diameters. Chain having widths of 2, 3, or 4", or even more, will sometimes be required. To make chains of such widths in the manner shown in Figures 1 to 4, inclusive, of the drawings, that is, with all of the links in one row of the chain abutting the links in the adjacent row, would require a greater number of links than necessary to give the needed tensile strength, and would add greatly to the weight of the transmission chain. Two relatively light chain structures close to the ends of the pins are shown in the modified form of the invention shown in Fig. 5 of the drawings. These two chains, 24 and 25, each of which is shown as being made up of three rows of links, are spaced close to the ends of the pins 26 and are held in such spaced relation by tubular spacers or sleeves 27 mounted on the pins between the two chains. The pin 26 is shown as having an enlarged conical head 28 on one end while the opposite end 29 is the same diameter as the shank 30 of the pin. The outer surface of the end 29 is conical in shape as shown at 31. A snap-ring 32 is mounted on the end 29 of the pin 26 and holds the pin, links and spacer sleeves in proper position. Figure 6 of the drawings shows a construction quite similar to Figure 5 for the same purpose and embodying the same advantages, the difference between the two structures being merely that in the structure shown in Figure 6 snap rings 33 and 34 are employed in lieu of the tubular spacer or sleeve 27.

Since, with wide chains such as shown in Figures 5 and 6 there will be a tendency for one side of the chain to run ahead of the other, thus cramping the pins and causing excessive wear, and to prevent such disadvantages, a further modification of the chain structure is shown in Figures 7 to 9, inclusive. In the modification shown in Figures 7 to 9 inclusive, rectangular members 35 which are substantially U-shaped in cross section are employed. These rectangular members 35 extend across two adjacent pins 36 and have their ends 37 bent at right angles to the main body of the rectangular members 35. The ends 37 engage over the pins 36, as clearly shown in Figures 8 and 9 of the drawings and serve the purpose of spacers for the two spaced chains 38 and 39 which go to make up, with the pins 36, this modified form of chain structure. The pins 36 are shown as of the same construction as shown in Figures 3 to 6, inclusive, of the drawings, that is, they have enlarged conical heads 40 on one of their ends, while their ends 41 are of the same diameter as the main body or shank of the pins. The pins 36 are alternately inserted from one side of the chain so that the flanges of a sheave (not shown) engaged by the conical heads 40 and the conical ends 41 will be alternately engaged by one of the ends 41 and heads 40 the same as the chain structure shown in Figure 3 of the drawings. Snap rings 42 are placed about the small ends of the pins and cooperate with the shoulders formed by the conical heads 40 in holding the various elements of the chain in proper adjusted positions. For the purpose of meeting conditions of slight axial misalignment of the sheaves without subjecting the chain to twisting forces the modification shown in Figures 10 and 11 of the drawings is provided. In this modified form the chain is made up of two spaced sets of links 45 and 46 which are shown held in spaced relation by tubular spacers or sleeves 47. The pins 48 are, however, longer than the maximum distance between the outer surfaces of the sets of links 45 and 46 so as to permit the pins 48 to move axially or longitudinally relative to the sets of links in the manner as shown in Figure 11 of the drawings to compensate for misalignment of the sheaves 49 and 50. To hold the two spaced sets of links 45 and 46 in their proper positions rectangular members 51 are provided. These rectangular members 51 are U-shaped in cross section and their laterally turned ends 52 engage the outer surfaces of the outermost links of the two sets of chains 45 and 46. As shown in Figure 11 of the drawings, the rectangular members 51 connect two adjacent pins of the chain structure so as to resist any tendency for one side of the chain to run ahead of the other, and they in cooperation with the tubular spacers 47 hold the two lengths of links 45 and 46 in their proper spaced relation. Axial movement of the pins 48 relative to the spacers 47, members 51, and lengths of links 45 and 46 is limited by the snap ring 53 carried by the small end of the pins 48 and the shoulder 54 formed by the enlarged conical head 55 on the other ends of the pins. The small ends of the pins 48 are conical in shape, as shown at 56.

The modified form of the chain shown in Figure 12 is similar to that shown in Figure 10, differing therefrom only in that the tubular spacer 60 extends through the side or spaced lengths of links 61 and 62 and has annular shoulders 63 thereon which engage against the inner surfaces of the innermost links of each length of links 61 and 62. Rectangular members 64, which are identical with the rectangular members 51 in construction and in function, are employed in this modification shown in Figure 12. The pins 65 have complete freedom of axial or longitudinal movement up to the instant they become wedged into place between the flanges of a V-grooved sheave (not shown).

It will be understood that the invention is not to be limited to the specific construction or arrangements of parts shown, but that they may be widely modified within the invention defined by the claims.

What is claimed is:

1. In a power transmitting chain for use in connection with variable pitch diameter sheaves of a variable speed transmission, a plurality of pins, a plurality of connecting links, said pins projecting laterally through said links and an appreciable distance beyond the sides of the links, the ends of said pins being conical in shape and snap rings on said pins for limiting axial movement of the pins relative to the links.

2. In a power transmitting chain for use in connection with variable pitch diameter sheaves of a variable speed transmission, a plurality of pins, a plurality of connecting links, said pins projecting laterally through said links and an appreciable distance beyond the sides of the links, each of said pins having an enlarged head on one end thereof, said heads having conical outer ends, the ends of the pins opposite to said heads being conical in shape and snap rings on the headless ends of the pins to limit axial movement of the pins relative to said links.

3. In a power transmitting chain for use in connection with variable pitch diameter sheaves of a variable speed transmission, a plurality of pins, a plurality of connecting links, said pins projecting laterally through said links and an appreciable distance beyond the sides of the links for engagement with the inner faces of a driving or driven sheave and to prevent contact of the links with a sheave, each of said pins having an enlarged head on one end thereof, said heads having conical outer ends, the ends of the pins opposite to said heads being headless and conical in shape, said pins being inserted through said links with the conical heads of adjacent pins on opposite sides of the links.

4. In a power transmitting chain for use in connection with variable pitch diameter sheaves of a variable speed transmission, a plurality of pins, a plurality of connecting links, said pins projecting laterally through said links and an appreciable distance beyond the sides of the links, each of said pins having an enlarged head on one end thereof, said heads having conical outer ends, the ends of the pins opposite to said heads being conical in shape, said pins being inserted through said links with the conical heads of adjacent pins on opposite sides of the links, and means engaging said pins and links to limit relative movement of the pins and links.

5. In a power transmitting chain for use in connection with variable pitch diameter sheaves of a variable speed transmission, a plurality of pins, a plurality of connecting links, said pins projecting laterally through said links and an appreciable distance beyond the sides of the links for engagement with the inner faces of a sheave and to prevent contact of the links with a sheave, the ends of said pins being conical in shape, and spacers for maintaining said links in proper position in the chain formation.

6. In a power transmitting chain for use in connection with variable pitch diameter sheaves of a variable speed transmission, a plurality of pins, a plurality of connecting links, said pins projecting laterally through said links and an appreciable distance beyond the sides of the links, the ends of said pins being conical in shape, said pins carried by said links for axial movement transversely of the links, and means for limiting the axial movement of the pins.

7. In a power transmitting chain for use in connection with variable pitch diameter sheaves of a variable speed transmission, a plurality of pins, a plurality of connecting links, said pins projecting laterally through said links and an appreciable distance beyond the sides of the links, the ends of said pins being conical in shape, said pins carried by said links for axial movement transversely of the links and means for maintaining all of the pins in a chain parallel one with the other during operation of the chain.

8. In a power transmitting chain for use in connection with variable pitch diameter sheaves of a variable speed transmission, a plurality of pins, a plurality of connecting links, said pins projecting laterally through said links and an appreciable distance beyond the sides of the links, the ends of said pins being conical in shape, said pins carried by said links for axial movement transversely of the links, means for limiting the axial movement of the pins, and means for maintaining all of the pins in a chain parallel one with the other during operation of the chain.

9. In a power transmitting chain for use in connection with variable pitch diameter sheaves of a variable speed transmission, a plurality of pins, a plurality of connecting links arranged in spaced chains with one spaced chain near each end of said pins, and spacing means engaging said links to maintain the chains in spaced relation, the ends of said pins being conical in shape.

10. In a power transmitting chain for use in connection with variable pitch diameter sheaves of a variable speed transmission, a plurality of pins, a plurality of connecting links arranged in spaced chains with one spaced chain near each end of said pins, and spacing means engaging said links to maintain the chains in spaced relation, each of said pins having an enlarged conical head on one end thereof, the ends of said pins opposite to said heads being conical in shape.

11. In a power transmitting chain for use in connection with variable pitch diameter sheaves of a variable speed transmission, a plurality of pins, a plurality of connecting links arranged in spaced chains with one spaced chain near each end of said pins, and spacing means engaging said links to maintain the chains in spaced relation, each of said pins having an enlarged conical head on one end thereof, the ends of said pins opposite to said heads being conical in shape, said pins being inserted through said links with the heads of the adjacent pins on opposite sides of the links.

12. In a power transmitting chain for use in connection with variable pitch diameter sheaves of a variable speed transmission, a plurality of pins, a plurality of connecting links arranged in spaced chains with one spaced chain near each end of said pins, spacing means engaging said links to maintain the chains in spaced relation, each of said pins having an enlarged conical head on one end thereof, the ends of said pins opposite to said heads being conical in shape, said pins carried by said links for axial movement transversely of the links, and means for limiting the axial movement of the pins.

13. In a power transmitting chain for use in connection with variable pitch diameter sheaves of a variable speed transmission, a plurality of pins, a plurality of connecting links arranged in spaced chains with one spaced chain near each end of said pins, spacing means engaging said links to maintain the chains in spaced relation, each of said pins having an enlarged conical head on one end thereof, the ends of said pins opposite to said heads being conical in shape, said pins being inserted through said links with the heads of the adjacent pins on opposite sides of the links, said pins carried by said links for axial movement transversely of the links, and means for limiting the axial movement of the pins.

14. In a power transmitting chain for use in connection with variable pitch diameter sheaves of a variable speed transmission, a plurality of pins, a plurality of connecting links arranged in spaced chains with one spaced chain near each end of said pins, spacing means engaging said links to maintain the chains in spaced relation, each of said pins having an enlarged conical head on one end thereof, the ends of said pins opposite to said heads being conical in shape, said pins being inserted through said links with the heads of the adjacent pins on opposite sides of the links, and means for maintaining all the pins in a chain parallel one with the other during operation of the chain.

15. In a power transmitting chain for use in connection with variable pitch diameter sheaves of a variable speed transmission, a plurality of pins, a plurality of connecting links arranged in spaced chains with one spaced chain near each end of said pins, spacing means engaging said links to maintain the chains in spaced relation, the ends of said pins being conical in shape, said pins carried by said links for axial movement transversely of the links, and means for limiting the axial movement of the pins.

16. In a variable speed drive the combination with a pair of V-groove sheaves having at least one flange movable to vary the pitch diameter of the sheave, of a power transmitting chain movable over said sheave and comprising a plurality of connecting links, a plurality of pins extending transversely through said links, said pins extending an appreciable distance beyond the outer sides of the links, each of said pins having an enlarged head on one end thereof, said heads having conical outer ends, the ends of said pins opposite to said heads being conical in shape said pins movable axially relative to said links to compensate for misalignment of the sheaves.

17. In a variable speed drive the combination with a pair of V-groove sheaves having at least one flange movable to vary the pitch diameter of the sheave, of a power transmitting chain movable over said sheave and comprising a plurality of connecting links, a plurality of pins extending transversely through said links, said pins extending an appreciable distance beyond the outer sides of the links, and movable axially relative to the links to compensate for misalignment of the sheaves each of said pins having an enlarged head on one end thereof, said heads having conical outer ends, the ends of said pins opposite to said heads being conical in shape, said pins being inserted through said links with the heads of adjacent pins on opposite sides of the links.

18. In a power transmitting chain for use with variable pitch diameter sheaves in a variable speed drive, a plurality of pins having conical ends for engagement with sheaves, a plurality of connecting links connecting the pins in chain formation and having their outermost lateral faces spaced inwardly from the ends of the pins a sufficient distance to prevent contact of the links with a sheave of a drive, and substantially U-shaped holding members engaging said links to hold them in proper lateral spaced relation.

19. In a power transmitting chain for use with variable pitch diameter sheaves in a variable speed drive, a plurality of pins having conical ends for engagement with sheaves, a plurality of connecting links connecting the pins in chain formation and having their outermost lateral faces spaced inwardly from the ends of the pins a sufficient distance to prevent contact of the links with a sheave of a drive, spacers on said pins and engaging said links, and substantially U-shaped holding members engaging said links and cooperating with said spacers to hold the links in proper lateral spaced relation.

20. In a power transmitting chain for use with variable pitch diameter sheaves in a variable speed drive, a plurality of pins having conical ends for engagement with sheaves, a plurality of connecting links connecting the pins in chain formation and having their outermost lateral faces spaced inwardly from the ends of the pins a sufficient distance to prevent contact of the links with a sheave of a drive, said pins carried by said links for axial movement relative to the links, means for limiting the axial movement of the pins relative to the links, and means to hold them in proper lateral spaced relation.

21. In a power transmitting chain for use with variable pitch diameter sheaves in a variable speed drive, a plurality of pins having conical ends for engagement with sheaves, a plurality of connecting links connecting the pins in chain formation and having their outermost lateral faces spaced inwardly from the ends of the pins a sufficient distance to prevent contact of the links with a sheave of a drive, said pins carried by said links for axial movement relative to the links, means for limiting the axial movement of the pins relative to the links, spacers on said pins and engaging said links, and substantially U-shaped holding members engaging the links and cooperating with said spacers to hold the links in proper laterally spaced relation.

LOUIS EATON SHAW.

REFERENCES CITED

The following references are of record in the file of this patent:

UNITED STATES PATENTS

| Number | Name | Date |
| --- | --- | --- |
| 702,874 | Howard | June 17, 1902 |
| 803,810 | Cutter | Nov. 7, 1905 |
| 1,691,871 | Reeves | Nov. 13, 1928 |